United States Patent

[11] 3,620,740

| | | | |
|---|---|---|---|
| [72] | Inventor | Albert Lucien Poot |  |
| | | Kontich, Belgium | |
| [21] | Appl. No. | 790,148 | |
| [22] | Filed | Jan. 9, 1969 | |
| [45] | Patented | Nov. 16, 1971 | |
| [73] | Assignee | Gevaert-Agfa N.V. | |
| | | Mortsel, Belgium | |
| [32] | Priority | Jan. 9, 1968 | |
| [33] | | Great Britain | |
| [31] | | 1,322/68 | |

[54] THERMODIAZO-TYPE COPYING
15 Claims, No Drawings

[52] U.S. Cl. .................................... 96/49,
96/75.91, 250/65.1, 117/36.8, 117/36.9
[51] Int. Cl. ....................................... G03c 5/18,
B41m 5/18, B41m 5/22
[50] Field of Search .......................... 96/91.75,
49; 250/65.1; 117/36.8, 36.9; 260/326.11

[56] References Cited
UNITED STATES PATENTS

| | | | |
|---|---|---|---|
| 2,501,874 | 3/1950 | Peterson | 96/75 X |
| 2,532,744 | 12/1950 | Straley | 96/91 |
| 2,815,338 | 12/1957 | Ruegg | 260/326.11 X |
| 3,149,990 | 9/1964 | Coles et al. | 96/75 X |
| 3,220,846 | 11/1965 | Tinker et al. | 96/91 |
| 3,281,244 | 10/1966 | Endermann et al. | 96/49 X |
| 3,303,028 | 2/1967 | Aebi et al. | 96/91 |
| 3,389,996 | 6/1968 | Welch | 96/49 X |
| 3,499,760 | 3/1970 | Amariti et al. | 96/91 X |

FOREIGN PATENTS

| | | | |
|---|---|---|---|
| 1,123,399 | 6/1956 | France | 96/49 |
| 815,005 | 6/1959 | Great Britain | 96/91 |
| 907,724 | 10/1962 | Great Britain | 96/49 |
| 983,665 | 2/1965 | Great Britain | 96/91 |

OTHER REFERENCES

Dietzgen, J. E., Reprod. Review, Feb. 1962, p. 14, 15, 22 and 26

*Primary Examiner*—Norman G. Torchin
*Assistant Examiner*—Charles L. Bowers, Jr.
*Attorney*—William J Daniel ABSTRACT: Diazo-type reproduction using as a latent diazonium coupling compound activable by heat an 3H-indolium compound.

THERMODIAZO-TYPE COPYING

The present invention relates to compounds, materials and processes for recording and reproducing information. More particularly the present invention is concerned with diazo-type copying.

Several attemps have been made to manufacture a single sheet thermodiazo-copying material. A survey of systems suited for thermodiazo-copying is given by B. Friedland, J. Phot.Sci. Vol. 10, 1962, p. 174–177. According to one of the systems described therein use is made of materials that are not couplers by themselves but that are capable of forming couplers under the influence of heat. The present invention relates to such system, according to which a special type of heat-sensitive latent coupler is used, wherefrom a coupler can be produced by heating, said coupler needing no alkali for coupling with a diazonium compound.

More particularly there has been found a thermodiazo process, wherein a compound suited for coupling with a diazonium compound is produced by heating of a quaternary heterocyclic nitrogen compound corresponding to the following general formula:

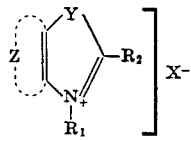

wherein:

Z represents the necessary atoms to close a homocyclic ring or ring system, e.g., an aromatic ring or aromatic ring system including a substituted aromatic ring and a substituted aromatic ring system, e.g., a benzene nucleus, a naphthalene nucleus, or a substituted benzene nucleus, e.g., a benzene nucleus substituted with a lower alkyl group, i.e., a $C_1$–$C_5$ alkyl group, preferably methyl and ethyl, phenyl, acetyl, alkoxy such as methoxy, nitro, cyano, acetoxy, hydroxyl, trifluoromethyl, amino, substituted amino, e.g., dialkylamino such as dimethylamino, acylamino, sulphamyl, acyl, e.g., acetyl and benzoyl, sulphonylalkyl, trifluoro-methyl-sulphonyl, or halogen, e.g., chlorine, bromine, iodine, or fluorine, $R_1$ represents an aliphatic group, including a cycloaliphatic, a saturated, an unsaturated and a substituted aliphatic group, e.g., an alkyl group, more particularly a $C_1$–$C_{18}$ alkyl group, an allyl group, a cycloalkyl group, e.g., a cyclopentyl or cyclohexyl group, a substituted cycloalkyl group, a substituted alkyl group, e.g., an aromatically substituted alkyl group, e.g., a benzyl group, a phenyl ethyl group, a substituted alkyl group, e.g., a carboxy substituted benzyl group, a sulpho substituted benzyl group, a halogenated benzyl group, such as a brominated benzyl group, a hydroxy-benzyl group, a hydroxyalkylene group, a carboxyalkylene group, a sulpho-alkylene group, a sulphatoalkylene group, a phosphoalkylene group, a phosphoester alkylene group, an acetoxyalkylene group, wherein the alkylene group preferably contains from 1 to 4 carbon atoms, such as in β-hydroxyethyl, β-acetoxyethyl, sulphopropyl, sulphobutyl, phosphopropyl, propyl sulfate, and butyl sulfate, further the group

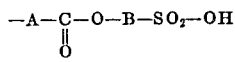

wherein A and B have the same significance as set forth in Belgian Pat. Specification 568,759 filed June 20, 1958 by Gevaert Photo-Producten N.V. or United Kingdom Pat. Specification 886,271 filed June 20, 1957 by Gevaert Photo-Producten N.V. such as a sulphocarbomethoxymethyl group, an ω-sulphocarbopropoxymethyl group, a p-(ω-sulphocarbobutoxy)-benzyl group, the group —A—W—NH—V—B wherein A, W, V and B have the same significance as set forth in Belgian Pat. Specification 569,130 filed July 4, 1958 by Gevaert Photo-Producten N.V. or United Kingdom Pat. Specification 904,332 filed July 5, 1957 by Gevaert Photo-Producten N.V. such as a N-(methyl-sulphonyl)-carbamylmethyl group, a γ-(acetyl-sulphonamido)-propyl, or a δ-(acetylsulphonamide)-butyl group, an aromatic group, e.g., a phenyl group, or $R_1$ and $R_2$ together represent the necessary atoms to form a five- or six-membered homocyclic ring, e.g., a —$(CH_2)_2$—or —$(CH_2)_3$ group, $R_2$ represents methyl, ethyl or

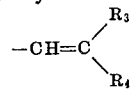

wherein each of $R_3$ and $R_4$ represents a lower alkyl radical (a $C_1$–$C_5$ alkyl radical), a methyl group, an ethyl group, an alkoxy group such as methoxy group or an ethoxy group, an alkylthio group such as a methylthio group, Y represents $\diagdown\!\!C(CH_3)_2\!\!\diagup$, sulfur or selenium, and $X^{'E}$ represents an anion e.g., a chloride, bromide, iodide, perchlorate, thiocyanate, benzene sulfonate, p-toluene sulfonate, methyl sulfate, ethyl sulfate or a propyl sulfate anion, but $X^{'E}$ is not present when the anion is already contained in the $R_1$ group.

It is assumed that by heating said quaternary heterocyclic nitrogen compound a methylene base is set free.

Quaternary heterocyclic nitrogen compounds falling within the scope of the general formula are common starting products in the preparation of trimethine dyes, which are used in silver halide photography as spectral sensitivity modifying agents; see therefor e.g., page 2 of the United Kingdom Pat. Specification 1,062,950 filed Dec. 31, 1963 by Gevaert Photo-Producten N.V and pages 6–9 of the Canadian Pat. Specification 725,634 filed May 28, 1962 by Gevaert Photo-Producten N.V. corresponding with United Kingdom Pat. Specification 1,001,061 filed May 29, 1961 by Gevaert Photo-Producten N.V 3-H-indolium compounds, perhaps more properly referred to as 3-H-indolenine compounds, falling within the scope of the above general formula are prepared by quaternization of the corresponding 3-H-indole compounds. To illustrate the preparation of 3-H-indolium compounds used according to the present invention the following examples are given.

Preparation of N-(2-hydroxyethyl)-2,3,3-trimethyl-3-H-indolium bromide 160 g. (1 mole) of 2,3,3-trimethyl-3-H-indole and 125 g. (1 mole) of 2-bromoethanol were dissolved in 500 CC. of n-propanol and refluxed for 15–20 hr. After having been cooled, the purple solution was decanted in approximatively 3 l. of ether. The salt settled in the form of an oil, which crystallized after a few minutes. The product was filtered with suction, washed with ether and dried. Subsequently, it is recrystallized from 1.3 l. of ethanol and dried in vacuo. Yield 165 g. (59 percent of pink crystals. Melting point: 194° C.

Preparation of 1,2,3,3-tetramethyl-3-H-indoliim methyl sulfate 160 g. (1 mole) of 2,3,3-trimethyl-3-H-indole and 126 g. (1 mole) of dimethyl sulfate are dissolved in 200 cc. of acetone and refluxed for 4 hours. After having been cooled, the deep purple solution was decanted in 1,500 cc. of dry ether. The pink crystalline deposit was filtered with suction, washed with dry ether, dissolved in 1 l. of dry ethanol, filtered and added whilst slowly stirring to 3 l. of dry ether. The white crystalline deposit is filtered with suction and dried in vacuo with phosphorus pentoxide. Yield 210 g. (73 percent of colorless, hygroscopic crystals. Melting point 157° C The temperature at which the methylene base can be set free from the quaternary compound in the presence of a diazonium compound in general is comprised between 70° and 140° C.

According to a preferred embodiment said quaternary compound and a suitable diazonium compound are incorporated into a single sheet material, wherein the methylene base coupler can be produced by heat and come into effective contact with the diazonium compound. By "effective contact" there is meant that the methylene base coupler and the diazonium compound are brought in such mutual condition that they can react with each other during the heating step.

Quaternary compounds particularly suited for being used according to the present invention are listed in the following table 1.

Especially good results are obtained with quaternary compounds according to the general formula wherein Y represents a >C(CH₃)₂ group.

TABLE 1

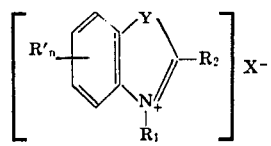

| | R₁ | R₂ | Rₙ' | Y | X⁻ | Melting point, °C |
|---|---|---|---|---|---|---|
| 1 | CH₂CH₂—OH | CH₃ | H | —C(CH₃)₂ | Br⁻ | 194 |
| 2 | CH₃ | CH₃ | 5-OH | —C(CH₃)₂ | I⁻ | 260 |
| 3 | CH₃ | CH₃ | 6-OH | —C(CH₃)₂ | I⁻ | ¹260 |
| 4 | CH₃ | CH₃ | H | —C(CH₃)₂ | I⁻ | ¹250 |
| 5 | CH₃ | CH₃ | H | —C(CH₃)₂ | CH₃SO₄⁻ | 157 |
| 6 | CH₃ | CH₃ | 5-OCH₃ | —C(CH₃)₂ | I⁻ | 245 |
| 7 | CH₃ | CH₃ | 4,5-CH=CH—CH=CH— | —C(CH₃)₂ | I⁻ | ¹245 |
| 8 | n-C₁₆H₃₃ | CH₃ | H | —C(CH₃)₂ | Br⁻ | 111 |
| 9 | (CH₂)₃OH | CH₃ | H | —C(CH₃)₂ | Br⁻ | |
| 10 | (CH₂)₄OH | CH₃ | H | —C(CH₃)₂ | Br⁻ | ¹250 |
| 11 | (CH₂)₄OCOCH₃ | CH₃ | H | —C(CH₃)₂ | Br⁻ | ¹260 |
| 12 | CH₂COOH | CH₃ | H | —C(CH₃)₂ | Br⁻ | 115 |
| 13 | (CH₂)₂COOH | CH₃ | H | —C(CH₃)₂ | Br⁻ | 184 |
| 14 | (CH₂)₃SO₃⁻ | CH₃ | H | —C(CH₃)₂ | | |
| 15 | CH₃ | CH₃ | H | S | CH₃SO₄⁻ | |
| 16 | CH₃ | CH₃ | 6-NO₂ | S | H₃C—⌬—SO₃⁻ | |
| 17 | CH₃ | CH₃ | 5-⌬ | S | CH₃SO₄⁻ | 164 |
| 18 | CH₃ | CH₃ | 5-Cl | S | I⁻ | |
| 19 | CH₃ | CH₃ | 5-⌬—CH₃ | S | CH₃SO₄⁻ | 182-190 |
| 20 | n-C₃H₇ | CH₃ | H | S | Br⁻ | 150 |
| 21 | C₂H₅ | CH₃ | 7-CH₃ | S | C₂H₅SO₄⁻ | 110 |
| 22 | CH₂—⌬ | CH₃ | H | S | Br⁻ | 240 |
| 23 | CH₂—⌬—COOH | CH₃ | H | S | Br⁻ | |
| 24 | Same as above | CH₃ | 5,6-CH₃ | S | Br⁻ | 260 |
| 25 | (CH₂)₂—COOH | CH₃ | 6-CH₃ | S | Br⁻ | |
| 26 | (CH₂)₂COOH | CH₃ | 7-CH₃ | S | Br⁻ | 225 |
| 27 | (CH₂)₂—COOH | CH₃ | H | S | Br⁻ | 230 |
| 28 | (CH₂)₃—OSO₃⁻ | CH₃ | H | S | | >260 |
| 29 | (CH₂)₃—OSO₃⁻ | CH₃ | 5,6-CH₃ | S | | >250 |
| 30 | (CH₂)₃—SO₃⁻ | CH₃ | 6-OCH₃ | S | | 260 |
| 31 | (CH₂)₄—SO₂—NH—CO—CH₃ | CH₃ | 5-⌬ | S | Br⁻ | 90 |
| 32 | CH₃—CO—NH—SO₂—CH₃ | CH₃ | 6-CH₃ | S | Br⁻ | 236 |
| 33 | (CH₂)₄—SO₂—NH—CO—CH₃ | CH₃ | 5,6-CH₃ | S | Br⁻ | 220 |
| 34 | CH₂—CO—NH—SO₂—CH₃ | CH₃ | 5-Cl | S | Br⁻ | |
| 35 | (CH₂)₂—P(=O)—(OC₂H₅)₂ | CH₃ | H | S | Br⁻ | 27 |
| 36 | ⌬ | CH₃ | H | S | I⁻ | 99 |
| 37 | —CH₂—CH₂—CH₂— | | H | S | Br⁻ | 246 |
| 38 | —CH₂—CH₂—CH₂—CH₂— | | H | S | Br⁻ | 226 |
| 39 | (CH₂)₃SO₃⁻ | CH₃ | H | Se | | 260 |
| 40 | CH₃ | CH=C(C₂H₅)(CH₃) | H | S | CH₃SO₄⁻ | 120 |
| 41 | CH₃ | CH=C(CH₃)(CH₃) | H | S | CH₃SO₄⁻ | 204 |
| 42 | C₂H₅ | Same as above | H | S | CH₃SO₄⁻ | 168 |
| 43 | CH₃ | CH=C(C₂H₅)—SCH₃ | H | S | CH₃SO₄ | 144 |
| 44 | C₂H₅ | CH=C(OC₂H₅)—CH₃ | H | S | C₂H₅SO₄ | 140 |
| 45 | C₂H₅ | CH=C(OCH₃)—CH₃ | H | S | CH₃SO₄⁻ | 162 |
| 46 | (CH₂)₂—OH | CH₃ | 5,6-CH₃ | S | Br⁻ | 242 |

¹ Decomposition.

Use can be made of a diazo compound, which at the time of the exposure to heat is present in the form of a diazonium salt. Preferred diazo compounds are the commonly used stabilized diazonium salts, preferably a zinc chloride double salt. Other stabilized derivatives may be used too, e.g., the fluoroborates and oxalates.

Exemplary diazo compounds are the diazonium salts prepared by diazotation of amines listed in table 2.

TABLE 2

1. p-amino-N,N-dimethylaniline
2. p-amino-N,N-diethylaniline
3. p-amino-N-ethyl-N-$\beta$-hydroxyethylaniline
4. p-amino-N-ethyl-N-benzylaniline
5. p-amino-phenylmorpholine
6. p-amino-(2,5-diethoxy)-N-benzoylaniline
7. p-amino-(2,5-dibutoxy)-N-benzylaniline
8. 4-amino-(2,5-dimethoxy)-4'-methyldiphenyl sulfide
9. p-amino-o-ethoxy-N,N-diethylaniline
10. p-amino-o-chloro-N,N-diethylaniline.

Suitable supports or carriers used in copying materials according to the present invention are absorbent materials, e.g., ordinary wood pulp paper or rag type paper but also textiles including fabrics made of cotton, cellulose acetate, regenerated cellulose, in other words all types of woven or felted materials, which can be impregnated with a solution containing one or more of the mentioned quaternary compounds, a diazonium compound or a mixture of diazonium compounds.

For producing transparent diazo prints it is preferred, however, to apply the quaternary compound to a transparent sheet, e.g., a water-impermeable resin sheet, as used, e.g., in transparent photographic silver halide materials. In this case the chemicals are preferably incorporated into a hydrophilic colloid layer, e.g., in a gelatin layer.

The coating composition containing a quaternary compound and a diazonium compound may contain other ingredients, e.g., wetting agents, substances generating a base on heating or a thermally activatable base releasing material e.g. urea and the substances used for that purpose described in the United Kingdom Pat. Specification 983,363 filed May 8, 1961 by Nashua Corp. and the French Pat. Specifications 1,376,708 and 1,376,709 both filed Sept. 17, 1963 by Et. Bauchet et Co., optical brightening agents, pigments, and antioxydants improving the whiteness of the areas, in which the diazonium compound has been destroyed. Suitable antioxydants are urea, thiourea, ascorbic acid and allyl isothiocyanate in concentrations ranging from 25 to 15 percent by weight in respect of the diazonium salts.

The storage stability of a coating composition containing (a) said quaternary compound(s) and (a) diazonium compound(s) can be improved by the addition of an acid e.g., citric acid, tartaric acid, boric acid, trichloroacetic acid, tribromoacetic acid, sulphosalicylic acid, phosphoric acid or 1,3,5-naphthalene-trisulphonic acid in an amount of 1 to 10 percent by weight in respect of the diazonium salt.

It is obvious that all known principles for preventing premature coupling can be applied in order to obtain a recording material with a storage stability as high as possible.

So, a premature coupling can be further prevented by physically separating the diazonium salt and the coupler-generating compound by means of a layer consisting of a meltable resinous material, which prevents the chemicals from coming into effective contact before heating. The resinous layer is melted by heating, which allows the chemicals to diffuse therein and react. For example a porous paper is first imbibed with the quaternary compound and then dried. To the dried paper a meltable resin layer, e.g., an hydrophobic alkyd resin, is coated from a solution and dried. Particularly suitable results can be attained by the use of rosin or a rosin ester such as an ester gum (see for ester gum, Ellis—The Chemistry of Synthetic Resins, p. 793 (1935), Reinhold Publishing Corporation). This coated sheet is then treated with a diazonium compound either or not in the presence of a hydrophilic binding agent, e.g., ethylcellulose.

According to another embodiment applied for preventing a premature coupling one or both of the reagents are encapsulated. By encapsulation the chemicals are enveloped in a thin continuous water-impermeable shell consisting, e.g., of a resinous material as described, e.g., in the United Kingdom Pat. Specifications 1,048,696 and 1,048,697 both filed July 10, 1963 by Gevaert Photo-Producten N.V. The nonencapsulated reagent is preferably applied in a continuous phase of hydrophilic colloid.

In connection with the present invention the term "thermodiazo process" includes any information-recording process, according to which said quaternary heterocyclic nitrogen compounds are used in combination with diazonium compounds, and wherein an azo dye is formed by starting from said compounds by means of heat.

Such information-recording process includes more particularly a first thermodiazo copying process comprising (1) the imagewise or recordwise exposure of a recording material containing a diazonium compound and such a quaternary heterocyclic compound to ultraviolet radiation, and (2) the nondifferential heating of the imagewise U.V.-exposed recording material, so that an azo dye is formed thereby in correspondence with the non-U.V.-exposed areas of the recording material. Such information-recording process also includes a second thermodiazocopying process comprising (1) the imagewise or recordwise heating of a recording material containing a diazonium compound and such a quaternary heterocyclic compound, so that an azo dye is formed thereby in correspondence with the imagewise heated areas of the recording material, and (2) the nondifferential exposure of the imagewise heated recording material to ultraviolet radiation in order to stabilize the image.

The following examples illustrate the invention.

EXAMPLE 1

| A solution consisting of: | |
|---|---|
| zinc chloride double salt of N,N-dimethyl-aminobenzene-diazonium-chloride | 1 g. |
| 1-hydroxyethyl-2,3,3-trimethyl-3-H-indolium bromide | 2 g. |
| 1,3,5-naphthalene trisulphonic acid | 5 g. |
| urea | 18 g. |
| water to | 100 cc. | was coated on a paper base material and then dried.

After drying, the recording material was exposed for 30 sec. through a positive silver image transparency by means of a high pressure mercury vapor bulb of 80 W placed at a distance of 15 cm. The development was carried out by contacting the exposed recording material with a heated roller (130° C) in a thermographic copying apparatus M 107 Dry Silver sold by Minnesota Mining and Manufacturing Company, St. Paul, Minn., U.S.A.

EXAMPLE 2

A solution as described in example 1 was prepared with the difference, that the zinc chloride double salt of N-hydroxyethyl-N-ethyl-aminobenzene diazonium chloride was used instead of the zinc chloride double salt of N,N-dimethylaminobenzene-diazonium chloride.

EXAMPLE 3

A solution as described in example 1 was prepared, with the difference, however, that 1-hydroxyethyl-2,3,3-trimethyl-3-H-indolium bromide was replaced by a same amount of 6-hydroxy-1,2,3,3-tetramethyl-3-H-indolium iodide.

EXAMPLE 4

A solution as described in example 1 was prepared, with the difference, however, that 2 g. of 1-sulphopropyl-2,3,3- trimethyl-3-H-indolium were added as a coupler-producing agent.

EXAMPLE 5

A solution as described in example 1 was prepared, with the difference, however, that instead of 100 cc. of water, 100 cc. of a 10 percent aqueous solution of gelatin were added. This solution was coated onto a transparent polyethylene terephthalate support.

EXAMPLE 6

A solution consisting of:

| | |
|---|---|
| zinc chloride double salt of N-hydroxyethyl-N-methylaminobenzene-diazonium chloride | 1 g. |
| 3-(2-hydroxyethyl)-2,5,6-trimethyl-benzothiazolium bromide | 1 g. |
| 1,3,5-naphthalene trisulphonic acid | 3 g. |
| urea | 10 g. |
| water to | 100 cc. | was coated on a paper base.

After drying the recording material was exposed and processed as described in example 1.

EXAMPLE 7

A solution consisting of:

| | |
|---|---|
| zinc chloride double salt of N-hydroxyethyl-N-methylamino-benzene-diazonium chloride | 200 mg. |
| compound 33 of Table 1 | 2 g. |
| trichloroacetic acid | 3 g. |
| urea | 10 g. |
| water to | 100 cc. | was coated on a paper base.

After drying the recording material was exposed and processed as described in example 1.

EXAMPLE 8

A solution consisting of:

| | |
|---|---|
| zinc chloride double salt of N,N-dimethyl-amino-benzene-diazonium chloride | 300 mg. |
| compound 39 of Table 1 | 500 mg. |
| trichloroacetic acid | 3.5 g. |
| urea | 10 g. |
| water to | 100 cc. | was coated on a paper base.

After drying the recording material was exposed and processed as described in example 1.

EXAMPLE 9

A solution consisting of:

| | |
|---|---|
| zinc chloride double salt of N,N-dimethylamino-benzene-diazonium chloride | 1 g. |
| compound 37 of Table 1 | 1 g. |
| trichloroacetic acid | 2 g. |
| urea | 10 g. |
| water to | 100 cc. | was coated on a paper base.

After drying the recording material was exposed and processed as described in example 1.

EXAMPLE 10

A three-layer heat-sensitive diazo-type material was built up as follows.

Onto a paper support a first composition containing the following ingredients was coated at a rate of 10 g. per sq.m.

| | |
|---|---|
| colloidal silica | 5 g. |
| 1-hydroxyethyl-2,3,3-trimethyl-3-H-indolium bromide | 12 g. |
| saponine | 0.1 g. |
| water | 500 cc |

After the first layer was dried, a second coating was applied thereto at a rate of 20 g. per sq.m from a composition containing the following ingredients.

| | |
|---|---|
| aqueous polyvinyl acetate dispersion containing 55 percent by weight of solids | 240 g |
| saponine | 0.2 g. |
| water | 465 cc. |

After the second layer was dried, a third coating was applied thereto at a rate of 15 g. per sq.m. from a composition containing the following ingredients:

| | |
|---|---|
| zinc chloride double salt of N-hydroxyethyl-N-methylamino-benzene diazonium chloride | 4.5 g. |
| citric acid | 3 g. |
| trichloroacetic acid | 7.5 g. |
| 1,3,5-naphthalene trisulphonic acid | 37.5 g. |
| zinc chloride | 3 g. |
| colloidal silica | 0.5 g |
| urea | 30 g. |
| saponine | 0.2 g. |
| 2% aqueous gelatin solution | 4.5 cc. |
| PLURONIC F 108 (trade name of Wyandotte Chemicals Corp. Wyandotte, Mich., U.S.A., for a polyoxyalkylene compound containing ethyleneoxy and isorpopyleneoxy recurring units) | 6 g. |
| water | 450 cc. |

After the third layer was dried, the material was exposed and further processed as described in example 1.

EXAMPLE 11

The material composition was the same as the one described in the foregoing example except that here the diazonium salt was the zinc chloride double salt of p-dimethylaminobenzene diazonium chloride.

EXAMPLE 12

The material composition was the same as the one described in example 10, except that here the diazonium salt was the zinc chloride double salt of N-hydroxyethyl-N-ethylamino benzene diazonium chloride.

EXAMPLE 13

A two-layer diazo-type material was built up as follows.

Onto a paper support a first composition containing the following ingredients was coated at a rate of 10 g. per sq.m.:

| | |
|---|---|
| colloidal silica | 5 g. |
| 1-hydroxyethyl-2,3,3-trimethyl-3-H-indolium bromide | 12 g. |
| saponine | 0.2 g. |
| aqueous polyvinyl acetate dispersion containing 55% by weight of solids | 120 g. |
| water | 500 cc. |

After drying, a second coating was applied thereto having the same composition as the third coating described in example 10. Thereupon the material was processed as described in example 1.

We claim:

1. In a process of recording information in a diazo-type material comprising a support carrying a diazonium compound and a latent heat releasable azo coupling compound, which comprises reacting in image areas of the said material the said diazonium compound and the said coupling compound heating to a temperature which enables coupling to occur in at least the image areas, and exposing the diazonium compound to actinic light in the nonimage areas to cause decomposition of the diazonium compound, the improvement wherein said latent coupling compound is a quaternary heterocyclic nitrogen compound corresponding to the following general formula:

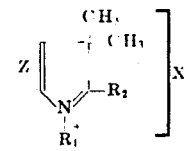

wherein:

Z represents the necessary atoms to close a benzene ring, $R_1$ represents an alkyl, phenylalkyl or phenyl group, said group representing $R_1$ may be substituted by X, or $R_1$ and $R_2$ together represent the necessary carbon atoms to form a saturated five- or six-membered homocyclic ring, $R_2$ represents methyl, ethyl or

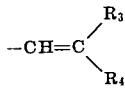

wherein each of $R_3$ and $R_4$ represents a lower alkyl radical, an alkoxy group or an alkylthio group, and $X'^{7E}$ represents an anion but is not present when $X'^{7E}$ is already present in $R_1$.

2. A process according to claim 1, wherein a recording material containing a diazonium compound and a said quaternary heterocyclic nitrogen compound is exposed imagewise to ultraviolet radiation, and the exposed recording material is uniformly heated to release said coupler for reaction with the diazonium compound in the unexposed areas.

3. A process according to claim 1, wherein a recording material containing a diazonium compound and a said quaternary heterocyclic compound is exposed imagewise to heat to release said coupler for reaction in the image areas with said diazonium compound and the heat-exposed recording material is uniformly exposed to ultraviolet radiation to decompose the unreacted diazonium compound.

4. A process according to claim 1, wherein the quaternary compound and the diazonium compound are applied to an absorbent sheet material.

5. A process according to claim 1, wherein the quaternary compound and the diazonium compound are applied in a hydrophilic colloid to a water-impermeable transparent resin layer.

6. A process according to claim 1, wherein the recording material contains a wetting agent, an optical brightening agent, a pigment and/or an antioxidant in combination with the quaternary compound and the diazonium compound.

7. A process according to claim 1, wherein the recording material contains an acid in combination with the quaternary compound and the diazonium compound.

8. A process according to claim 1, wherein the quaternary compound is incorporated into an absorbent support material, shielded from intimate contact with the diazonium compound by a coating of a meltable resin, and said diazonium compound is applied over said resin coating.

9. A process according to claim 1, wherein the quaternary compound is encapsulated in a continuous water-impermeable meltable resin shell and the diazonium compound as well as the capsules are incorporated into a continuous hydrophilic binder.

10. A process according to claim 1, wherein the diazonium compound is encapsulated in a continuous water-impermeable meltable resin shell and the quaternary compound as well as the capsules are incorporated in a continuous hydrophilic binder.

11. A process according to claim 8, wherein the intermediate meltable layer is composed of rosin or an ester gum.

12. A diazo-type copying material containing a diazonium compound and as a latent heat-releasable azo coupling compound a quaternary heterocyclic nitrogen compound corresponding to the following general formula:

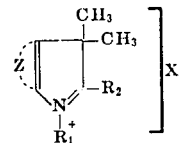

wherein:

z represents the necessary atoms to close a benzene ring, $R_1$ represents an alkyl, phenylalkyl or phenyl group, said group representing $R_1$ may be substituted by $X'^{7E}$ or $R_1$ and $R_2$ together represent the necessary carbon atoms to form a saturated five- or six-membered homocyclic ring, $R_2$ represents methyl, ethyl or

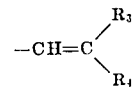

wherein each of $R_3$ and $R_4$ represents a lower alkyl radical, an alkoxy group or an alkyl-thio group, and $X'^{7E}$ represents an anion but is not present when $X'^{7E}$ is already present in $R_1$.

13. A diazo-type copying material according to claim 12, wherein said compounds are applied to a porous support.

14. A diazo-type copying material according to claim 12, wherein said compounds are applied in a binder to a transparent support.

15. A diazo-type copying material according to claim 12, wherein the diazonium compound and the quaternary compound are separated from coming into effective contact with each other by including only one of said compounds in a meltable layer or capsule shell.

UNITED STATES PATENT OFFICE
CERTIFICATE OF CORRECTION

Patent No. 3,620,740　　　　　　Dated November 16, 1971

Inventor(s) Albert Lucien POOT

It is certified that error appears in the above-identified patent and that said Letters Patent are hereby corrected as shown below:

Column 8, claim 1, line 60, before "heating", insert -- by --.

in the formula, correct as follows:

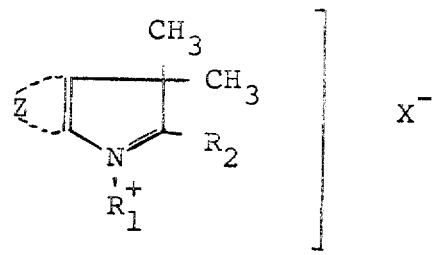

Column 9, claim 1, line 4, change "X" to -- $X^-$ --.

, line 15, change "$X^{'7E'}$" (both occurrences) to -- $X^-$ --.

Column 10, claim 12, lines 26 and 37, change "$X^{'7E'}$" (all occurrences) to -- $X^-$ --.

Signed and sealed this 23rd day of May 1972.

(SEAL)
Attest:

EDWARD M. FLETCHER, JR.　　　　ROBERT GOTTSCHALK
Attesting Officer　　　　　　　Commissioner of Patents